No. 685,988. Patented Nov. 5, 1901.
C. J. HOLM.
APPARATUS FOR MEASURING PULVERULENT ARTICLES.
(Application filed May 27, 1901.)
(No Model.)
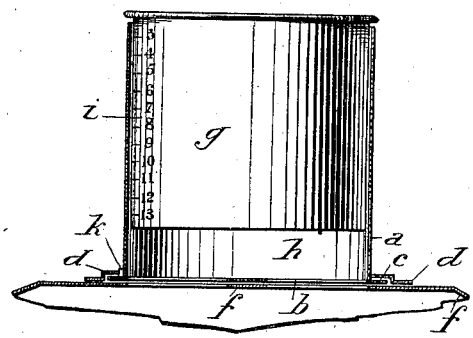
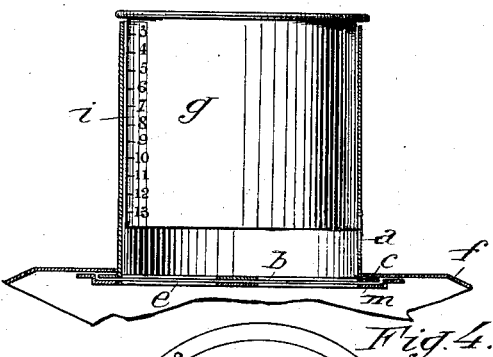
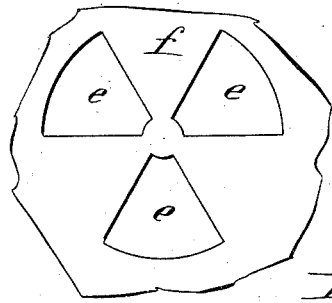
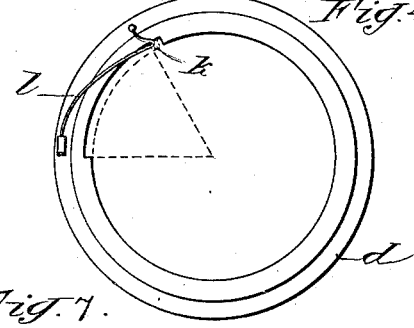
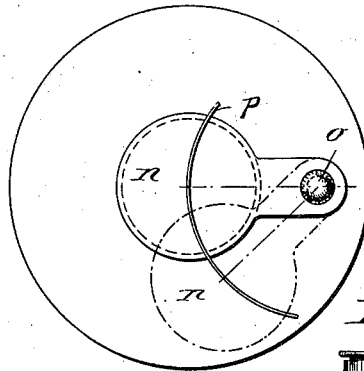
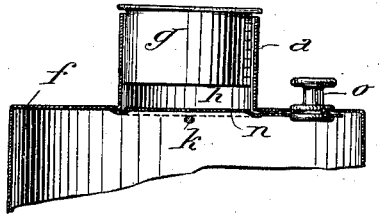
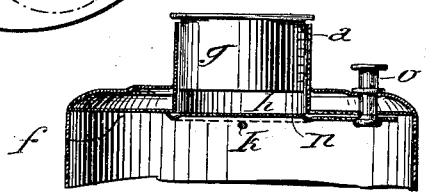
Witnesses:
G S Noble
Jacob Heller.
Inventor,
Carl Julius Holm
by P. J. Singer
Att'y.

UNITED STATES PATENT OFFICE.

CARL JULIUS HOLM, OF JURJEW, RUSSIA.

APPARATUS FOR MEASURING PULVERULENT ARTICLES.

SPECIFICATION forming part of Letters Patent No. 685,988, dated November 5, 1901.

Application filed May 27, 1901. Serial No. 62,097. (No model.)

*To all whom it may concern:*

Be it known that I, CARL JULIUS HOLM, a subject of the King of Denmark, and a resident of Jurjew, Russia, have invented certain new and useful Improvements in Apparatus for Measuring Pulverulent Articles, of which the following is a specification.

My present invention relates to a measuring apparatus, the object being to provide a device of this kind whereby coffee, tea, and the like inclosed in boxes may be withdrawn in required quantities without exposure to the air.

The invention consists of the novel construction and combination of parts fully described and claimed hereinafter.

In the accompanying drawings, forming a portion of this specification, Figure 1 is a transverse sectional view of one form of embodiment of my invention. Fig. 2 is a similar view of a somewhat modified construction. Fig. 3 is a broken plan view of the cover of the apparatus. Fig. 4 is a plan view showing a stop device for the measuring-cylinder. Figs. 5 and 6 show modified constructions. Fig. 7 is a bottom plan view of the constructions shown in Figs. 5 and 6.

Like letters refer to like parts throughout all the figures.

Referring to the drawings, and particularly to Fig. 1, $a$ represents a measuring-cylinder, $b$ the bottom thereof, said cylinder being guided by means of its lower edge $c$ in an annular flange $d$, so that it is adapted to be rotated on its axis. The bottom $b$ is provided with openings $e$, adapted to register with openings provided in the cover $f$ of the case when the cylinder $a$ is brought to a given position. The cylinder $a$ is closed outwardly by means of a stopper $g$, adapted to extend nearly to the bottom of said cylinder and preferably to such a point so as to leave a free space $h$ between said bottom and the stopper. Said space may be adjusted by withdrawing the stopper $g$ to a greater or less extent, and said adjustment may be determined by means of a scale $i$, arranged on the side of the stopper.

The improved device operates as follows: When it is desired to remove a given quantity of the article from the box, said quantity is adjusted by means of the scale $i$, arranged on the stopper, while the cylinder $a$ is rotated so as to cause the bottom openings to register with the openings in the cover of the box. Then the latter is turned over, whereby the space $h$ is filled with the article, whereupon the cylinder $a$ is again rotated, so as to close the aforesaid openings. Then the contents of the space $h$ may be removed after withdrawing the stopper $g$.

The rotation of the cylinder $a$ is limited by means of a lug $k$, working in a slot provided in the flange $d$. A spring $l$ is provided to retain the cylinder $a$ in the position wherein the space $h$ is not in communication with the interior of the box. It will be understood that said spring may be omitted and another suitable device substituted therefor.

The form of embodiment shown in Fig. 2 is characterized by the fact that the cylinder $a$ passes through the cover $b$ and is held and guided by means of a second bottom $m$, arranged within the box.

In the constructions shown in Figs. 5, 6, and 7 the meansuring-cylinder $a$ is rigidly connected with the cover $f$. The space $h$ is brought into communication with the interior of the boxes by means of a slide $n$, adapted to be brought by means of a button $o$ in front of the opening of the cylinder $a$. Said slide is guided by means of a wire $p$, which presses said slide against said cover $f$, made flat in this form of construction.

Having fully described my invention, what I claim, and desire to secure by Letters Patent, is—

1. In a device of the class described, the combination with the box containing the articles to be measured, of a cylinder rotatably connected with a cover $f$ of the box, a cylindrical stopper fitted in said cylinder for adjustment therein to regulate the space between the lower end of the stopper and the cover of the box, the cover of said box and the bottom of said cylinder having openings which are brought into or moved out of registration by the rotation of the cylinder, substantially as described.

2. In a device of the class described, the combination with the box for containing the articles to be measured, and a cover $f$, for said box, said cover $f$, having an opening, of a cylinder connected to the cover $f$, means for closing communication between the box and cylinder, a curved spring engaging said closing means, and a scaled cylindrical stopper fitted in the cylinder for adjustment therein to regulate a space between the lower end of the stopper and the cover of the box, substantially as described.

3. In a device of the class described, the combination with the box containing the articles to be measured, of a cylinder rotatably connected with a cover $f$ of the box, a stopper $g$ adapted to adjust a free space $h$, and openings in the bottom of the cylinder and the cover of the box, said openings adapted to register with one another, and means for retaining the cylinder in the position wherein the space $h$ is not in communication with the interior of the box, substantially as set forth.

In testimony whereof I have hereunto set my hand in presence of two witnesses.

CARL JULIUS HOLM.

Witnesses:
JOHANN HEINRICH HOPPE,
AGNES FRANCISCUS KOFOEDHAUSEN.